June 13, 1950     J. O. HRUBY, JR     2,511,506
AUTOMATIC RIVETER
Filed March 7, 1944     2 Sheets-Sheet 1
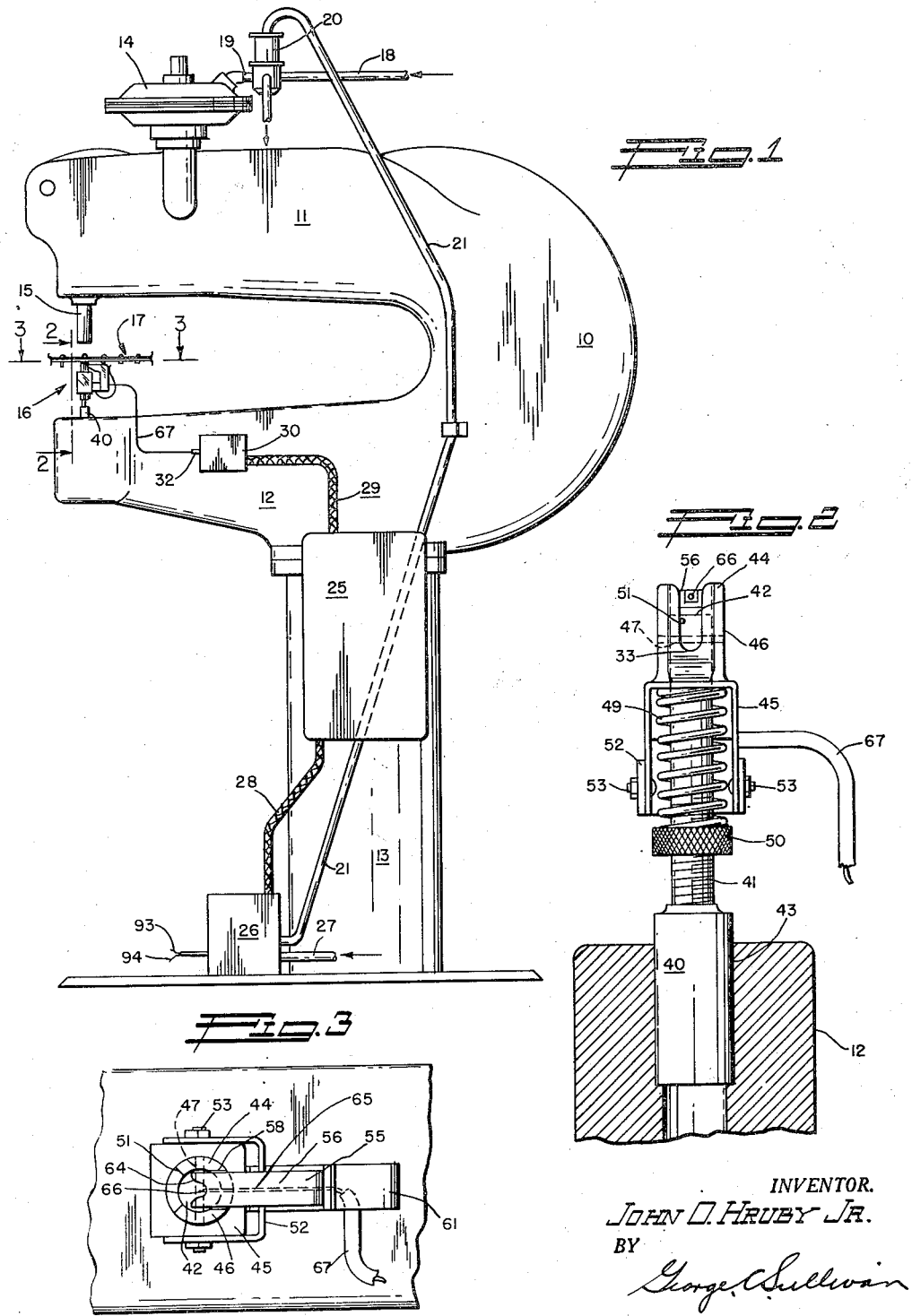
INVENTOR.
JOHN O. HRUBY JR.
BY
George C. Sullivan
AGENT

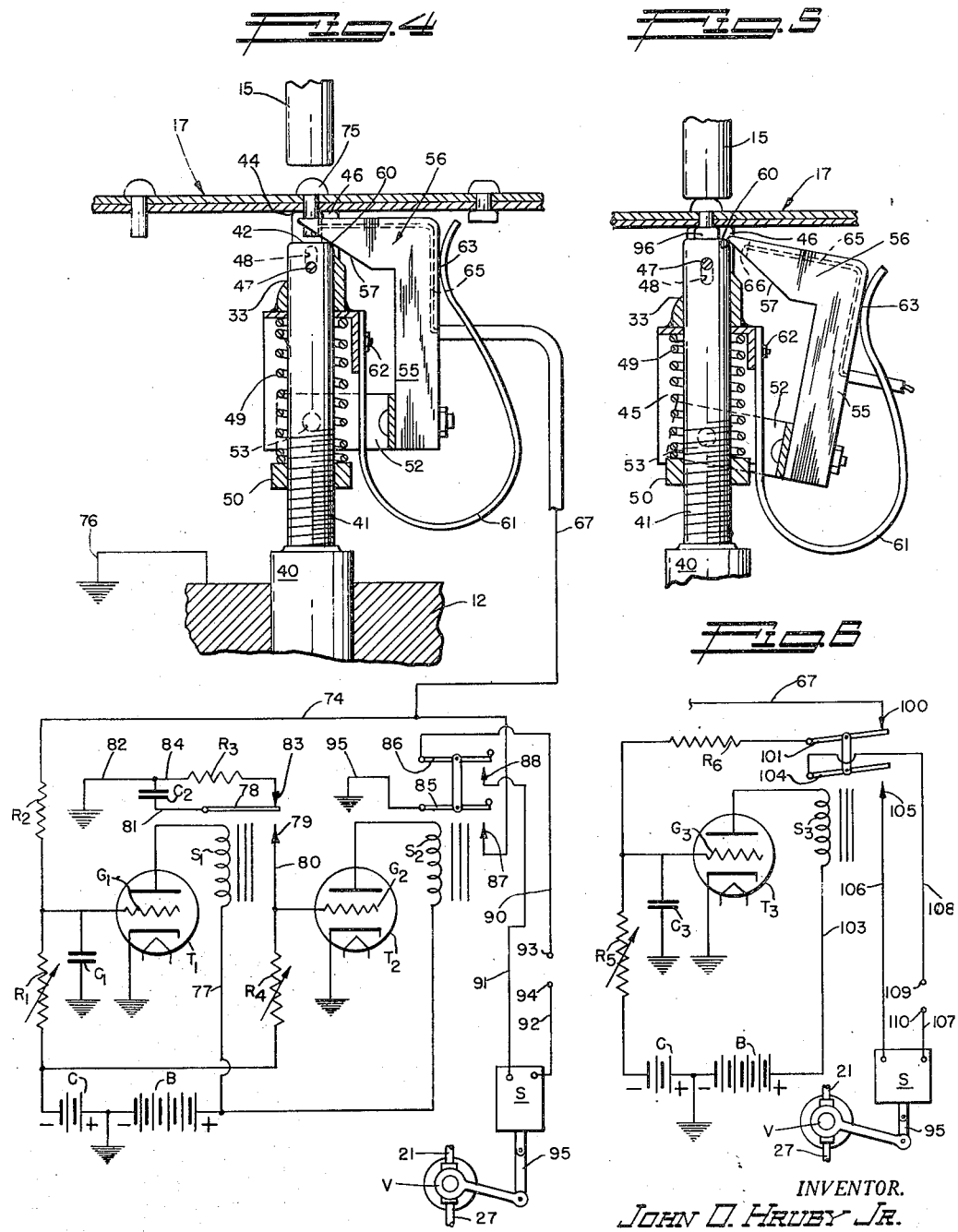

Patented June 13, 1950

2,511,506

UNITED STATES PATENT OFFICE 2,511,506

AUTOMATIC RIVETER

John O. Hruby, Jr., Glendale, Calif., assignor to Lockheed Aircraft Corporation, Burbank, Calif.

Application March 7, 1944, Serial No. 525,414

12 Claims. (Cl. 78—48)

This invention relates to automatic riveting machines in general, and more particularly to the automatic control of machines for upsetting rivets in pre-punched or pre-drilled sheet metal parts in the manner commonly employed for riveting airplane skin panels, and the like.

This invention may be adapted to numerous uses, but finds its principal application in automatic riveting tools wherein an electrical contact made with an unset rivet located in place in the part to be riveted initiates and controls the riveting action. The present invention is primarily directed to the form of riveting tool involving rapid automatic actuation and control, together with suitably safety mechanism which allows actuation of the machine only when the pre-punched or drilled sheets containing the unset rivets in place in the rivet hole have been located precisely in the correct position in the machine, between the riveting punch and anvil, and the prevention of inadvertent operation of the dimpler prior to such proper location of the work, and also to prevent inadvertent repetition of the riveting operation at a single riveting location.

This invention thus finds one of its most important applications in the fabrication of sheet metal airplane parts which require the riveting together of one or more super-imposed parts or sheets usually of extensive size and area such as a wing or fuselage panel requiring a large number of rivets, often placed in long rows, in which the rivet holes have been previously punched or drilled, and in which the rivets are previously inserted in place in such holes preparatory to their rapid successive upsetting.

Various forms of riveting tools have been heretofore employed for use with either one shot or diaphragm types of rivet squeezers. As customarily operated, these rivet machines have a foot switch or air valve to be manually actuated by the operator after he has located the rivet within the center of the riveting punch and anvil.

With such manual operation of the squeezer mechanism it is possible for the machine to be actuated prior to proper location of the work sheet carrying the rivet in the machine, or during the step of shifting the work sheet to adjust the rivet to the proper position from one work position to another, and thus inadvertent operation of the machine often occurs accidentally, apparently due to momentary lapses of proper coordination of the operator, probably brought about by the fatigue associated with rapid operation. Such inadvertent operation of the machine usually results in serious damage to the work piece, and at times, injury to the operator.

It is accordingly an object of this invention to eliminate the usual manual controls employed for operation of the rivet squeezer, and to reduce the time consuming and tedious manipulation required to properly locate the rivet within the squeezer, thereby reducing fatigue and giving the operator greater freedom of movement and facility of handling the work sheet applied to the riveting machine.

It is another object of this invention to provide an automatic riveting machine, through which the pre-punched or pre-drilled parts containing inset rivets may be rapidly fed, and by which setting of each rivet will be automatically and rapidly effected when each rivet in the work sheet reaches the proper location in the machine.

It is a further object of this invention to provide means for facilitating the guidance of the rivets in the parts to be riveted to the proper location within the riveting machine. It is a still further object to furnish a practical safety means to prevent inadvertent actuation of the machine while the work sheet containing the rivets is improperly located. It is a still further object of the present invention to provide automatic actuation of the machine of such character as will produce uniform setting of rivets independent of the skill of the operator.

The objects are attained in general by an embodiment of the invention which includes an automatic mechanism associated with the die which renders the squeezer machine inoperative unless the rivet carried in the work sheet is in its precisely correct position between the die and the punch, and which will then substantially automatically initiate the action of the punch when the work sheet carrying the rivet is so located.

The objects of this invention are also attained by novel electrical timing and control means associated with the before mentioned automatic die mechanism.

These and other objects and features of novelty will become evident hereinafter in the description, which together with the following drawings, illustrate preferred embodiments of the invention.

Figure 1 is an elevation of a typical squeeze riveting machine showing the general arrangement of the apparatus of this invention therein.

Figure 2 is an enlarged front elevation of the automatic riveting head assembly as viewed on line 2—2 of Figure 1.

Figure 3 is a plan view of the automatic riveting head assembly as taken on line 3—3 of Figures 1 and 2.

Figure 4 is a side elevation of the automatic riveting head of Figure 2 and including a schematic representation of an associated electric control circuit.

Figure 5 is a fragmentary side elevation view of the automatic riveting head of Figure 4 at one of the stages of its operation.

Figure 6 is a schematic wiring diagram of an alternative control and timing circuit.

Referring now to the drawings in which like reference numerals refer to corresponding parts throughout the several figures, the apparatus of the invention is as follows:

The apparatus of this invention as employed in connection with a conventional pneumatic squeezer machine is shown in Figure 1, said machine comprising a yoke 10 having upper and lower jaws 11 and 12 supported on a pedestal 13. On the upper jaw 11 is a diaphragm cylinder 14, the diaphragm piston of which is operatively connected through suitable linkages to the reciprocable punch holder 15. The automatic riveting head including the riveting anvil which comprises a principal part of the invention, may be mounted in either jaw of the pneumatic squeezer, but has been shown for convenience as supported in the lower jaw of the squeezer yoke in operative position as shown at 16 aligned directly beneath the said punch 15. In operation the pre-punched or drilled sheet carrying the unset rivets inserted in place in the holes, is introduced into the machine between the punch and anvil set as shown at 17 in Figure 1. If the riveting head is placed in the upper jaw it is necessary to invert the work sheet, and under such condition the rivets previously inserted in the hole may be retained in place by means of adhesive paper tape. Air under pressure from a suitable source is supplied to the diaphragm cylinder 14 by pipes 18 and 19, through a pilot operated control valve 20. The pilot valve 20 is adapted to be controlled by the variation of low pressure air in pipe 21 by a solenoid operated air valve V as hereinafter more fully described.

The electric timing and control circuit is contained within a box 25 mounted on the squeezer pedestal 13, and the before mentioned solenoid control valve is housed in a box 26 which may be placed in any convenient location. Low pressure air is applied to the solenoid valve V in box 26 from a suitable source through pipe 27. The electric wires interconnecting the electric control circuit and the solenoid operated valve pass through a suitable shielded conduit as shown at 28. The electrical conductor from the electric control circuit in box 25 passes through a suitable shielded conduit 29 to a terminal box 30 into which the lead conductor 67 extending from the automatic riveting head 16 makes a plug connection as shown at 32.

Referring now primarily to Figures 2 to 5, the body of the automatic riveting head comprises a cylindrical shank 40 carrying an integrally formed, upwardly extending threaded spindle 41 terminating at the top end in an anvil surface 42. The shank 40 is adapted to fit into the cylindrical holding recess in the lower jaw 12 and to retain the automatic riveting head in an upright position in alignment with the riveting punch holder 15 as best shown in the assembly of Figure 1 and in cross-sectional detail in Figures 2 and 4.

A yoke 45 carrying an integrally formed cylindrical guide shoe member 46 is reciprocably supported on the upper portion of the stem 41. The guide shoe has a bore adapted to make a slidable fit over the unthreaded upper end of the stem 41 adjacent the anvil surface 42, and two opposite cylindrical segmental top portions normally extend a suitable distance thereabove as best shown at 44 in Figures 2 and 4. A pin 47 fixed transversely through the stem extends laterally through opposite longitudinal slots 48 formed in the sides of the guide shoe body, which serve as stops to limit the axial movement of the said yoke and guide shoe on the stem. A coil spring 49 surrounding the stem 41 and acting under compression against an adjusting nut 50 threaded on the lower portion of the stem 41 and against the inner upper surface of the yoke 45, serves to urge the yoke and guide shoe to the fully extended position as limited by the before mentioned pins 47 and slots 48, as best shown at Figure 4.

The upper portion of the cylindrical guide shoe 46 has a forwardly directed V-shaped guide opening extending down from the top end thereof to a point 33 a substantial distance below the top surface of the anvil 42 as normally positioned, the opening being formed in effect by removal of a cylindrical segment as best shown at 51 in Figures 2 and 3.

A slot is formed in the rearward top portion of the guide shoe as shown at 58 opposite to the said forwardly directed V-shaped guide opening 51, of a suitable size to receive the tapered end portion of the movable contactor arm 56 which is described hereinafter.

A U-shaped hinge member 52 straddles the lower portion of the yoke 45 and is pivotally connected thereto by means of oppositely positioned pins or bolts as shown at 53. Attached to the shoulder of the U-shaped hinge member 52, and pivotally supported thereby, is an L-shaped contactor arm 55. The laterally extending portion 56 of the arm 55 is formed with a diagonal cam surface 57, the tapered inner end of which normally extends over the upper end of the anvil 42 through the before mentioned rearward slot 58 formed in the guide shoe. The said cam surface 57 is constantly urged inward into contact with the curved outer edge of the anvil 42 as shown at point 60 in Figure 4 by means of the leaf spring 61 which is attached to the yoke 45 at 62, and bears inwardly against the arm 55 at 63. The forward cammed end of the arm 56 which normally extends over the upper surface of the anvil 42 is formed with a V-shaped depression or guide as shown at 64. The arm 55—56 is preferably made of fibre or plastic or other suitable insulating material and carries imbedded therein, as shown at 65, an electrical conductor. The said electrical conductor is positioned to extend or project from the end of the contact arm 56 centrally within the guide depression of the contact guide 64, as shown at 66, to form a small contact electrode. The conductor 65 carried within the contactor arm 55—56, is connected by an insulated lead conductor 67 through plug 32 and connector box 30 to the electronic control equipment as hereinafter more fully described.

Referring now primarily to Figure 4 in which a suitable electronic control circuit is diagrammatically illustrated, the principal components thereof are as follows: $T_1$ and $T_2$ are vacuum tubes which may be of substantially any of the well known suitable types. For example, a type 6N7 tube which is a twin triode containing the elements of the two tubes in one envelope, may be advantageously employed, although for convenience, two separate tubes are herein illustrated. $S_1$ and $S_2$ are single pole double throw and double pole single throw magnetic relays respectively. $C_1$ and $C_2$ are condensers, and $R_1$, $R_2$, $R_3$ and $R_4$ are resistors of suitable values. The high voltage supply for the plates of the vacuum tubes is supplied from a suitable source, such as, for example, a battery B which may be of approximately 150 volts D. C., and a negative grid bias is obtained from a suitable battery C which may be approximately 5 volts. Suitable variation in these voltages may be made as is well known in the art.

The operation of the automatic riveter in combination with the electronic control circuit of Figure 4 is as follows: When the riveter mechanism is not in operation and the electronic circuit is quiescent, the vacuum tubes $T_1$ and $T_2$ are maintained non-conductive, or at a low conductivity, by reason of their grids $G_1$ and $G_2$ being biased to cut-off, or close to cut-off, potential by the battery C. Under this initial condition, the condenser $C_1$ is charged to a voltage at or approximately the grid cut-off potential of tube $T_1$ as just stated. Upon inserting the work sheets 17 containing rivets between the punch and anvil of the automatic riveter and bringing a rivet as shown at 75 through the guide V 51 and into contact with the electrode 66 in the end of the contactor arm as best shown in Figure 4, the charge on condenser $C_1$ is discharged through the limiting resistance $R_2$, conductors 74 and 67, contact 66, and thence through the rivet shank and through the automatic riveting head mechanism to ground 76. Resistance $R_1$ being relatively high, the battery C cannot immediately restore the charge in condenser $C_1$. The grid $G_1$ of the tube $T_1$ is thus lowered to substantially cathode potential which immediately renders the tube $T_1$ sufficiently conductive to operate the relay $S_1$. The resultant current flow from battery B through the tube $T_1$ from cathode to anode and through the electro-magnet of the relay $S_1$ and return through conductor 77, moves the relay armature 78 into contact with point 79. The grid $G_2$ of vacuum tube $T_2$ is thus next connected to ground through conductor 80, relay armature 78, conductor 81, condenser $C_2$ and connection 82. The condenser $C_2$ having been previously bridged by resistance $R_3$, which is connected to ground 84—82, the grid $G_2$ is thus also next reduced to substantially cathode potential which immediately renders the tube $T_2$ sufficiently conductive to operate the relay $S_2$. The timing constant of the circuit comprising $C_2$ and resistance $R_4$ is such that the grid $G_2$ will not immediately return to cut-off potential. This time delay period may be adjusted between suitable limits by means of the variable resistance $R_4$. Upon grounding the grid $G_2$ through the condenser $C_2$ as before mentioned, the resultant flow from cathode to anode through the vacuum tube $T_2$ and through the electro-magnet of the relay $S_2$ causes the interlinked armatures 85 and 86 to be moved into contact with the points 87 and 88 respectively. Upon thus closing the contact between armature 86 and contact point 88, an electric circuit is completed through the solenoid S by way of conductors 90, 91 and 92, whereby the current flows through and actuates the solenoid from a suitable source which may be connected to the circuit at 93 and 94.

The resultant actuation of the valve V through linkage 95 by means of the solenoid S, causes air pressure to be applied to cylinder 14, and the rivet punch 15, to be lowered forcefully into contact with the head of a rivet and to upset the shank thereof against the anvil 42 in the manner hereinbefore described in connection with Figure 1 and as best shown at 96 in Figure 5. Simultaneously, upon completing the circuit upon energizing relay $S_2$, the relay armature 85 is moved into contact with point 87. As the riveting punch 15 is lowered into contact with the head of the rivet, force is applied through the rivet and through the sheet 17 to the top member 44 of the guide shoe 46, and the continued downward motion of the punch 15 in upsetting the rivet against the upper end of the anvil 42 as shown in Figure 5, results in corresponding downward movement of the yoke 45 against the force of the spring 49, carrying with it the arm 55. The resultant downward motion of the arm 55 with the yoke 45 causes relative motion between the cam surface 57 and the edge of the anvil 60, such as to rotate the arm contactor 55 clockwise about the hinge centers 53 a sufficient distance to remove the cammed end portion out of its initial position in slot 58 between the punch 15 and anvil 42 to the new position shown in Figure 5. The contactor arm may be withdrawn by suitable electric, hydraulic, pneumatic or mechanical means, an example of the latter means comprising the cam 57 being herein shown as a preferred construction. The contact between electrode 66 and the shank of the rivet is thus broken immediately after the initial completion of the circuit therethrough and the guide 64 carrying the electrode 66 is removed from a position adjacent the rivet during the upsetting of the rivet. Meanwhile, however, the connection thus broken at 66 has been shunted by the relay $S_2$ as hereinbefore described. This latter step in the operation of the circuit insures completion of the riveting cycle regardless of how brief the contact of electrodes 66 with the rivet may have been. In other words, the relay $S_2$ acting through armature 85 temporarily locks the vacuum tube $T_1$ in a conductive condition for a predetermined adjustable period of time by maintaining its grid $G_1$ at ground potential through the circuit comprising conductor 74, contact 87, armature 85 and ground connection 95.

After a period of time, the length of which is dependent upon the constant of the timing circuit comprising the resistance $R_4$ and the condenser $C_2$, as hereinbefore mentioned, the potential of the grid $G_2$ in tube $T_2$ will return to its cut-off value by flow of current from battery C through $R_4$, whereupon this tube will be rendered non-conductive. The resultant cessation of flow of current through the relay $S_2$ will then in turn allow the armatures 85 and 86 of relay $S_2$ to return to the initial position shown opening the circuits at contacts 87 and 88. The following resulting de-energization of the solenoid S will allow valve V to return to its normal position and the punch 15 to rise to its open position after having completed the upsetting of the rivet. After the breaking of the locking-in circuit at contact 87, and after a predetermined adjustable period of time determined by the constants of the timing circuit for the tube $T_1$ comprising the condenser $C_1$ and the variable resistance $R_1$, the grid $G_1$ of tube $T_1$ will return to its cut-off potential by flow of current from battery C through $R_1$. The following resultant cessation of current through the relay $S_1$ will then allow the armature 78 to return to the position shown, re-establishing contact with point 83 and thereby discharging condenser $C_2$ to ground potential in readiness for the next operating cycle.

The time constant of the timing circuits $R_1$—$C_1$ and $R_4$—$C_2$ may be adjusted to suit the particular operating condition obtaining by variation of either the resistances or the capacities in the manner well known by those skilled in the art. However, adjustment of the constant of these timing circuits may be most conveniently made by employing suitable variable resistances in $R_1$ and $R_4$.

The values of $R_1$ and $C_1$ may be approximately 500,000 to 1,000,000 ohms and 0.5 microfarad respectively for a time period of approximately 0.3 to 0.6 second. The values of $R_4$ and $C_2$ may be approximately 750,000 ohms and 0.5 microfarad respectively for a time period of approximately 0.1 to 0.5 second.

Referring now to Figure 6, an alternative electronic control circuit is diagrammatically illustrated, the principal components of which are as follows: $T_3$ is a suitable vacuum tube which may be, for example, a type 6C5 triode, $S_3$ is a double relay, $C_3$ is a condenser, $R_5$ and $R_6$ are resistors of suitable values. The high voltage supply for the plate of the vacuum tube is supplied from a suitable source such as a battery B, as described hereinbefore in connection with Figure 4. Various common ground connections are shown throughout the circuit. The operation of the apparatus of this invention in conjunction with the electronic control circuit of Figure 6 is as follows: Prior to grounding the electrode 66 through an introduced rivet and while the squeezer mechanism is not in operation, the electronic circuit is quiescent and the vacuum tube $T_3$ is in a non-conductive or low conductivity condition by reason of the grid $G_3$ being biased to cut-off or close to the cut-off potential by the battery C. Under this condition the condenser $C_3$ is correspondingly charged to the grid potential. Upon completing the circuit to ground through electrode 66, lead 67, contact 100, armature 101, and current limiting resistance $R_2$, the charge on condenser $C_3$ is immediately lowered to ground and cathode potential. The resistance $R_5$ being relatively high and in the neighborhood of 750,000 ohms and the condenser $C_1$ of approximately 0.5 microfarad, the battery C cannot immediately restore the charge in condenser $C_3$, the grid G of the tube $T_1$ is thus lowered to substantially cathode potential which immediately renders it sufficiently conductive to actuate the relay $S_3$.

The resultant current flow from battery B through the tube $T_3$ from cathode to anode and through the electro-magnet of the relay $S_3$ and return through conductor 103, moves the relay armature 101 away from contact with point 100 and simultaneously moves the armature 104 into contact with point 105. Upon thus closing the contact between armature 104 and contact point 105 an electric circuit is completed through the solenoid S by way of conductors 106, 107 and 108 whereby a current may flow therethrough from a suitable source which may be connected at 109 and 110. The resultant operation of valve V through linkage 85 causes the riveter punch 15 to be lowered into contact with the rivet head as hereinbefore described.

After a predetermined adjustable period of time which should be slightly more than sufficient for completion of the downward movement of the punch 15 to upset the rivet in the rivet hole, the length of which is dependent upon the constant of the timing circuit comprising the before mentioned variable resistance $R_5$, and the condenser $C_3$, the grid G connected thereto returns to cut-off potential, or to a potential which will result in sufficient reduction of the plate current to release the relay $S_3$. The resultant cessation or reduction of current flow through the relay $S_3$ allows the armatures 101 and 104 to return to the positions shown, breaking the circuit through the solenoid S and re-establishing contact of the armature 101 with contact point 100, thereby again connecting the control circuit to the contact 66 in readiness for the next riveting cycle. Simultaneously, upon thus opening the circuit through the solenoid S the valve V returns to its off position, thereby actuating the pilot valve 20 to exhaust the air from the diaphragm cylinder 14 and to allow the punch 15 to rise, completing the operating cycle of the machine.

As the force of the riveting punch 15 is removed from the top of the head of the rivet, the guide shoe 46 also rises upward on the spindle 41 under the force of spring 49, carrying with it the U-shaped hinge member 52 and the arm 55—56. The arm 55—56 under the force of the leaf spring 61 moves inward from the position shown in Figure 5 to that shown in Figure 4 maintaining contact between the cam surface 57 and the edge of the anvil at point 60. The electrode 66 in the guide depression 64 is thus reset in its initial position adjacent the center of the anvil in readiness for contact with the next rivet shank to be fed into position for riveting.

As before stated, the present invention has for one of its advantages the elimination of the foot-pedal heretofore employed for either the initiation or the actuation of the riveting tool. The elimination of the manual control of the riveter has resulted in the removal of a principal source of fatigue for the operator. Heretofore the uniformity of the quality of riveted connections produced by the machine when manually controlled, were dependent largely upon the manner of manipulating the control; thus slow, light pressure on the foot pedal or other manual control produced insufficiently upset rivets, while fast, sudden, or heavy pressure produced too great an upset on the rivets. The production of perfectly set rivets heretofore required intense concentration, and such coordination of eyes and feet as obviously resulted in sufficient nerve strain and fatigue to result in a substantially reduced rate of production, with frequent poorly set rivets, and at times, damage to the sheet metal parts upon which the operations were being performed. Damage has also often been done to the parts being riveted, and also to the machine by which the riveting was being performed by rough operation of unskilled workmen.

Another particularly important feature of this invention resides in the combination of the mechanism with electronic control means actuated by contact with the part upon which the work is to be performed. This makes the device practical in connection with the use of aluminum, particularly anodized aluminum rivets, which ordinarily have an oxide coating sufficiently resistant to render other electric contact and actuation means inoperative.

In the apparatus of the present invention, due to the fact that no manual coordination or operation other than feeding the work material containing the rivets into the machine is required, and by reason of the fact that it is impossible to actuate the riveter until the rivet in the work sheet is precisely positioned on the rivet anvil in alignment with the rivet punch, anyone without previous experience can produce perfectly riveted joints at a high production rate. Also, positively and uniformly set rivets will always be produced due to the uniform pressure obtained. While the present automatic riveting control is illustrated for use with a riveting tool, it is obvious that it may be employed in connection with any similar tool.

The electronic circuit of Figure 4 may be advantageously employed for control of other similar machines, one such machine for which it is particularly well suited, being shown and described in the Christensen Patent No. 2,438,842, which issued March 30, 1948, from an application filed of even date herewith.

It is to be understood therefore that the foregoing is not to be limiting, but may include any and all forms of method and apparatus which are included within the scope of the claims.

I claim:

1. In an automatic riveting tool, apparatus comprising a riveting punch, a riveting anvil in alignment therewith, a movable guide sleeve adjacent said anvil, and normally extending above the surface of said anvil and adapted to support a work piece containing a rivet to be set, a movable electrode associated with said sleeve and normally located intermediate said punch and anvil surfaces, and adapted to contact a rivet placed in setting position therebetween, means actuated by relative movement between said anvil and said sleeve to move said electrode from its position between said punch and anvil, and electrical control means in circuit with said electrode and adapted to be energized by the contact of said electrode with said rivet to actuate said punch.

2. In an automatic riveting tool, apparatus comprising a riveting punch, a riveting anvil in alignment therewith, a movable guide sleeve carried on said anvil and normally extending above the surface of said anvil and adapted to support a work piece containing a rivet to be set, a movable electrode hinged to said sleeve and normally located intermediate said punch and anvil surfaces and adapted to contact a rivet place in setting position therebetween, means actuated by relative movement between said anvil and said sleeve imparted by said punch to move said electrode away from its position intermediate said punch and anvil surfaces, and electrical control means in circuit with said electrode to actuate said punch.

3. Apparatus according to claim 2 in which the means actuated by relative movement between said anvil and said sleeve comprises a cam surface associated with said electrode and adapted to move in contact with the anvil.

4. In an automatic riveting tool, apparatus comprising a riveting anvil body, a retractable guide sleeve reciprocably supported on said anvil body and normally extending above the working surface thereof, a spring urging said guide sleeve in said extended position, an arm hinged to said guide sleeve and supporting an electrode adjacent the working surface of said anvil, said electrode being adapted to make electrical contact with a rivet to be set when said rivet is properly positioned on said anvil body, a cam surface associated with said arm and actuated by said anvil to move said arm relative to the said anvil working surface upon retraction of said sleeve on said anvil body, and means to retract said guide sleeve upon said anvil body against the force of said spring during the setting of a rivet.

5. In an automatic riveting tool, apparatus comprising a riveting anvil body, a retractable guide sleeve reciprocably supported on said anvil body and having a portion normally extending above the working surface thereof adapted to support a work piece containing a rivet to be set, a spring urging said guide sleeve in said extended position, an arm hinged to said guide sleeve and supporting an electrode adjacent the working surface of said anvil in a position adapted to make electrical contact with a rivet placed in setting position thereon, a cam surface associated with said arm and actuated by said anvil to move said arm away from the said anvil working surface and to break said electrical contact upon retraction of said sleeve upon said anvil body, and punch operated means to impart movement from a work piece placed upon said portion of said guide sleeve to retract said guide sleeve upon said anvil body against the force of said spring during the setting of a rivet.

6. Apparatus according to claim 1 and a slot in the upper end of the guide sleeve adapted to receive and guide a rivet to a setting position over the anvil surface.

7. Apparatus according to claim 4 and a slot in the upper end of the guide sleeve adapted to receive and guide a rivet to a setting position over the anvil surface.

8. Apparatus according to claim 1 and a guide associated with said arm and said electrode adapted to position a rivet over the working surface of said anvil.

9. Apparatus according to claim 4 and a guide associated with said arm and said electrode adapted to position a rivet over the working surface of said anvil.

10. An electronic timing control apparatus comprising a first vacuum tube having a grid, means to charge said grid to bias it to a non-conducting state, a timing circuit electrically connected with the grid of said first vacuum tube and arranged to render said first vacuum tube conductive for a predetermined time when said timing circuit is energized, a second vacuum tube having a grid, means to charge said grid to bias it to a non-conducting state, a timing circuit electrically connected with the grid of said second vacuum tube and arranged to render said second vacuum tube conductive for a predetermined period of time, a first relay electrically connected to said first vacuum tube and said second timing circuit and so arranged that when said first vacuum tube is rendered conductive by its timing circuit said first relay closes the second timing circuit to said second vacuum tube whereby to render the latter conductive for a predetermined period of time, a second relay electrically connected to said second vacuum tube and so arranged as to be closed by the second vacuum tube when the latter is conductive, said second relay being electrically connected in the first timing circuit in such a way as to lock said first timing circuit out in a condition to render said first vacuum tube conductive so long as said second vacuum tube is conductive, a switch closed by said second relay whereby to actuate the apparatus to be controlled, and switch means carried by said controlled apparatus arranged to initially close said first timing circuit to render said first vacuum tube conductive.

11. An electronic timing control apparatus comprising a first vacuum tube having a grid, means to charge said grid to bias it to a non-conducting state, a timing circuit electrically connected with the grid of said first vacuum tube and arranged to render said first vacuum tube conductive for a predetermined time when said timing circuit is energized, a second vacuum tube having a grid, means to charge said grid to bias it to a non-conducting state, a timing circuit electrically connected with the grid of said second vacuum tube and arranged to render said second vacuum tube conductive for a predetermined period of time, a first relay electrically connected to said first vacuum tube and said second timing circuit and so arranged that when said first vacuum tube is rendered conductive by its timing circuit said first relay closes the second timing circuit to said second vacuum tube whereby to render the latter conductive for a predetermined period of time, a second relay electrically connected to said second vacuum tube and so arranged as to be closed by the second vacuum tube when the latter is conductive, said second relay being electrically connected in the first timing circuit in such a way as to lock said first timing circuit out in a condition to render said first vacuum tube conductive so long as said second vacuum tube is conductive, a switch closed by said second relay whereby to actuate the apparatus to be controlled, and switch means arranged to momentarily close said first timing circuit to render said first vacuum tube conductive.

12. An electronic timing control apparatus comprising a vacuum tube having a grid, an electric circuit for charging said grid whereby to normally maintain said vacuum tube non-conductive, a timing circuit including the grid of said vacuum tube and so arranged when closed as to render said vacuum tube conductive for a predetermined period of time, a relay electrically in circuit with said vacuum tube when the latter is rendered conductive, an electric circuit arranged to be closed by said relay when the vacuum tube is conductive, said last mentioned circuit being arranged to actuate apparatus to be controlled, a switch also arranged to be actuated by said relay to maintain said timing circuit in an activated condition to render said vacuum tube conductive for a predetermined period of time, and means associated with said apparatus to be controlled and with said switch including an electric circuit from said apparatus to said timing circuit arranged to be opened to disconnect said timing circuit from said apparatus during the period of time when said vacuum tube is conductive.

JOHN O. HRUBY, Jr.

REFERENCES CITED

The following references are of record in the file of this patent:

UNITED STATES PATENTS

| Number | Name | Date |
|---|---|---|
| 376,541 | Mergenthaler | Jan. 17, 1888 |
| 555,131 | Thomson | Feb. 25, 1896 |
| 945,802 | Pratt | Jan. 11, 1910 |
| 1,180,047 | Kobert | Apr. 18, 1916 |
| 1,582,217 | Henry | Apr. 27, 1926 |
| 2,055,767 | Rippl | Sept. 29, 1936 |
| 2,089,637 | Adair | Aug. 10, 1937 |
| 2,207,055 | Goodling et al. | July 9, 1940 |
| 2,215,388 | Butter | Sept. 17, 1940 |
| 2,269,603 | Rockwood, Jr. | Jan. 13, 1942 |
| 2,340,552 | Mortl | Feb. 1, 1944 |
| 2,355,520 | Fischer et al. | Aug. 8, 1944 |
| 2,371,358 | Sekella | Mar. 13, 1945 |
| 2,372,516 | Rechton et al. | Mar. 27, 1945 |
| 2,377,032 | Osborne | May 29, 1945 |
| 2,387,478 | Tiffany | Oct. 23, 1945 |
| 2,438,842 | Christensen | Mar. 30, 1948 |

FOREIGN PATENTS

| Number | Country | Date |
|---|---|---|
| 327,370 | Great Britain | Apr. 3, 1930 |